June 14, 1960  C. O. POUDER  2,940,755
TOY HORSE
Filed Oct. 9, 1957
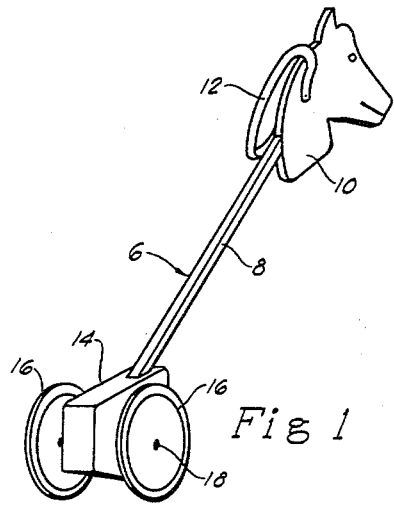
Fig 1
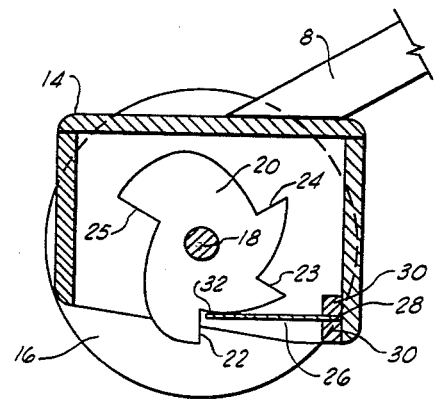
Fig 2
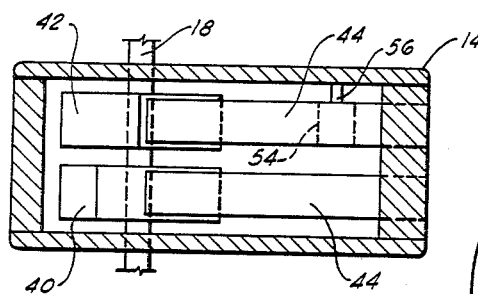
Fig 3
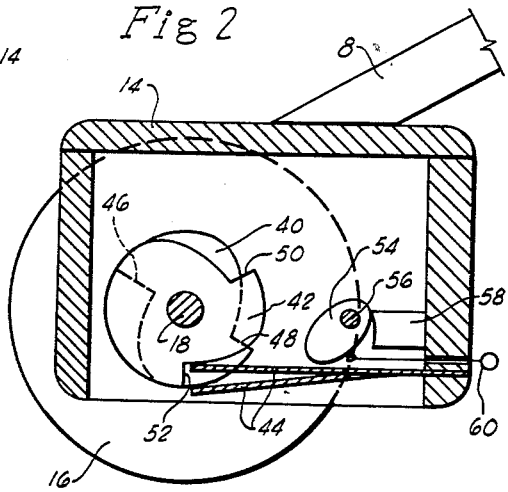
Fig 4
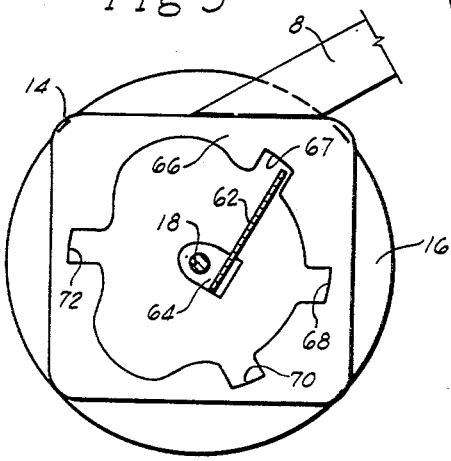
Fig 5
INVENTOR.
CLAIR O. POUDER
BY 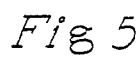
ATTORNEY

United States Patent Office 2,940,755
Patented June 14, 1960

2,940,755
TOY HORSE

Clair O. Pouder, Oklahoma City, Okla., assignor to A. E. Warnberg, Oklahoma City, Okla.

Filed Oct. 9, 1957, Ser. No. 689,101

1 Claim. (Cl. 272—1)

This invention relates to an improved toy simulating a horse, and more particularly, but not by way of limitation, to an improved stick horse which, in motion, produces sounds simulating a horse's hoof beats.

An important object of this invention is to provide a toy which will produce sounds accurately representative of a horse's hoof beats upon movement of the toy over the floor or ground.

Another object of this invention is to provide a toy having the general appearance of a conventional stick horse and yet produces sounds simulating a horse's hoof beats.

A further object of this invention is to provide a toy which is simple in construction and may be economically manufactured.

Other objects and advantages of the invention will be evident from the following detailed description, when read in conjunction with the accompanying drawings which illustrate my invention.

In the drawings:

Figure 1 is a perspective view of a stick horse incorporating the present invention.

Figure 2 is a vertical sectional view through one form of sound box which may be attached to the lower end of a stick horse or the like.

Figure 3 is a transverse sectional view through a modified sound box looking upwardly at the sound producing cams and tongues.

Figure 4 is a vertical sectional view through the sound box shown in Fig. 3.

Figure 5 is a vertical sectional view through a still further modified sound box.

Referring to the drawings in detail, and particularly Fig. 1, reference character 6 generally designates a stick horse having an elongated stick 8 to be straddled by a child, and a simulated horse head 10 on the upper end of the stick 8. If desired, a strap 12 may be secured to the head 10 to be grasped by the child while riding the stick horse 6. A sound box 14 is secured on the lower end of the stick 8 and is supported between a pair of wheels 16 mounted on the opposite ends of an axle 18 extending transversely through the box 14. The wheels 16 are rigidly secured on the axle 18 to provide rotation of the axle with the wheels. In accordance with the present invention the box 14 contains means for simulating a horse's hoof beats upon movement of the stick horse 6 along the ground or floor.

In its preferred form, the present invention comprises a cam 20 rigidly secured on the shaft 18 within the box 14 as ililustrated in Fig. 2. The cam 20 has a series of four steps 22, 23, 24 and 25 formed in the outer periphery thereof to actuate a clacker tongue 26. The precise geometrical arrangement of the steps produces a cycle of clacks or sounds simulating the hoof beats of a galloping horse. The steps 22, 23 and 24 are arranged around the periphery of the cam 20 through a portion less than ½ the periphery of the cam, that is, within an arc of less than 180 degrees. The remaining step 25 is positioned approximately half way between the adjacent steps 22 and 24. Also, the step 25 should be deeper than the remaining steps to provide a more pronounced clack when the step 25 actuates the tongue 26.

The tongue 26 may be formed out of any desired material, such as wood or steel which is resilient and will produce a pronounced clack when actuated by the cam 20. One end 28 of the tongue 26 is suitably secured between a pair of blocks 30 to the forward end of the sound box 14 in such a position that the opposite end 32 of the tongue rides on the outer periphery of the cam 20. The resilient construction of the tongue 26 constantly urges the end 32 generally toward the supporting axle 18 so that the tongue 26 will be actuated by each of the steps in the cam upon rotation of the cam 20. It will be observed that since the cam 20 is rigidly secured on the shaft 18, the cam 20 will be rotated simultaneously with the wheel 16 to move the steps through 25 under the tongue 26 in succession and provide a clacking sound each time a step is moved beyond the end 32 of the tongue. In operation, the cam 20 is turned clockwise when viewed as in Fig. 2.

As illustrated in Figs. 3 and 4, I may use two cams 40 and 42 within the sound box 14 to produce sounds simulating a horse's hoof beats. Each of the cams 40 and 42 is rigidly secured on the shaft or axle 18, and each cam is contacted by a clacker tongue 44 extending rearwardly from the forward wall of the sound box 14. The cam 40 has two steps 46 and 48 formed in the outer periphery thereof in substantially diametrically opposed relation. The step 46 is preferably deeper than the step 48 to produce a louder clack upon the respective tongue 44 contacting the step 46 in the manner previously described in connection with Fig. 2. The cam 42 has two steps 50 and 52 formed in the outer periphery thereof a distance apart slightly less than ½ the periphery of the respective cam and having a depth corresponding to the depth of the step 48. In assembling the cams 40 and 42 on the axle 18, they are positioned (as illustrated in Fig. 4) in such a manner that the steps 50, 48 and 52 are arranged through an arc less than 180 degrees, with the result that the larger step 46 is positioned approximately half way between the adjacent steps 50 and 52. Thus, the cams 40 and 42, when operating together, function in substantially the same manner as the single cam 20 described above in connection with Fig. 2.

As further illustrated in Fig. 4, I provide a locking member 54 in the sound box 14 in the form of a cam rigidly secured on a shaft 56 in a position directly above one of the tongues 44. The cam 54 is of a size to engage the respective tongue 44 and hold the tongue downwardly away from the respective cam 40 or 42 when turned in one position (not shown) and to retract from the respective tongue 44 when turned in a position substantially 90 degrees from the locking position. The locking cam 54 is retained in contact with a curved block 58 to retain its locked and unlocked positions. Any suitable means may be used to turn the locking cam 54, such as a string 60 extending through a complementary aperture in the forward wall of the sound box 14. It will also be apparent that the shaft 56 is journaled in one side of the sound box 14, as shown in Fig. 3, to support the locking cam 54 in the desired position.

As previously indicated, when the locking cam 54 is in an unlocked position, as shown in Fig. 4, and both of the tongues 44 of the embodiment shown in Figs. 3 and 4 are in operation, the resulting sound produced by both of the tongues simulates the hoof beats of a galloping horse is substantially the same manner as the embodiment shown in Fig. 2. However, when the locking cam 54 is moved to a locked position and one of the tongues 44 is removed from its respective cam, the remaining tongue 44 will produce only two clacks upon each rotation of the respective cam to simulate the hoof beats of a trotting horse. Thus, the embodiment shown in Figs. 3 and 4 may be used to produce either the sound of a galloping horse or the sounds of a trotting horse, as desired.

In the two embodiments previously described I have provided rotation of the cam means simultaneous with rotation of the wheels 16 of the toy 6, while retaining the tongue or tongues in a fixed position relative to the horse. If desired, the tongue may be rotated with the wheels 16 while retaining the cam means stationary. Such a construction is illustrated in Fig. 5. The tongue 62 of the structure shown in Fig. 5 is secured by a suitable bracket 64 to the axle 18 so that the tongue 62 will be rotated upon rotation of the wheels 16. A hollow cam member 66 is suitably secured in the sound box 14 around the tongue 62 to produce clacking sounds upon rotation of the tongue. To produce such sounds, I provide four slots 67, 68, 70 and 72 around the inner periphery of the cam 66 to engage the outer end of the tongue 62. The slots 66, 68 and 70 are arranged through an arc less than 180 degrees, and the slot 72 is positioned opposite the slot 68 approximately half way between the slots 66 and 70. As the tongue 62 is turned in the cam 66 (which will be clockwise as illustrated in Fig. 5) the outer end of the tongue 62 will be clacked as the tongue is moved past each of the slots 66 through 72. Thus, the slots 66 through 72 perform the same function as the steps in the cams previously described to produce clacking sounds simulating the hoof beats of a galloping horse upon movement of the top 6 over the floor or ground.

From the foregoing it will be apparent that the present invention provides a novel toy simulating the appearance of a horse and which will produce sounds simulating the hoof beats of a horse when the toy is moved over the ground or the floor. The sounds may be either the sounds simulating a galloping horse or a trotting horse. It will be further apparent that the present toy is simple in construction and may be economically manufactured.

Changes may be made in the combination and arrangement of parts or elements heretofore set forth in the specification and shown in the drawings without departing from the spirit and scope of the invention as defined in the following claim.

I claim:

In a wheel supported toy simulating a horse, the improvement which comprises: a sound box secured to the toy; a pair of clacker discs rotatably supported in the toy; a pair of clacker discs rotatably supported in the sound box and secured to a wheel of the toy for rotation in unison with rotation of the wheel, each of said discs having two steps in the outer periphery thereof with the steps in one disc being in approximately diametrically opposed relation and the steps in the other disc being spaced apart a distance less than one hundred eighty degrees in one direction; a resilient clacker tongue for each disc, each tongue being anchored at one end in the sound box in such a position that the opposite end of the tongue bears against the outer periphery of the respective disc within the sound box; said discs being arranged to provide a series of three clacks by the tongues in less than one hundred eighty degrees rotation of the wheel and a single clack at approximately the center of the remaining degrees of rotation of the wheel to simulate the sound of a galloping horse; a cam rotatably supported by the toy adjacent the tongue associated with the disc having the steps in diametrically opposed relation for bending the respective tongue in a direction away from the respective disc in one position of the cam to simulate the sound of a trotting horse upon rotation of the wheel, and means for turning the cam to selected positions for selectivity simulating the sound of a galloping and a trotting horse.

References Cited in the file of this patent

UNITED STATES PATENTS

| | | |
|---|---|---|
| 507,851 | Shetter | Oct. 31, 1893 |
| 530,584 | Eccleston | Dec. 11, 1894 |
| 1,103,030 | Cafferty | July 14, 1914 |
| 1,361,386 | Kalamen | Dec. 7, 1920 |
| 1,513,552 | Iadarola | Oct. 28, 1924 |
| 2,578,682 | Fernstrom | Dec. 18, 1951 |

FOREIGN PATENTS

| | | |
|---|---|---|
| 634,468 | Great Britain | Mar. 22, 1950 |